United States Patent
Browne et al.

(10) Patent No.: US 8,678,426 B1
(45) Date of Patent: Mar. 25, 2014

(54) VEHICLE BRAKE COOLING SYSTEM

(71) Applicant: GM Global Technology Operations LLC, Detroit, MI (US)

(72) Inventors: Alan L. Browne, Grosse Pointe, MI (US); Tadge J. Juechter, Troy, MI (US); Nancy L. Johnson, Northville, MI (US); Paul W. Alexander, Ypsilanti, MI (US); Xiujie Gao, Troy, MI (US); Richard J. Skurkis, Lake Orion, MI (US); Kirk D. Bennion, Mount Clemens, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/756,582

(22) Filed: Feb. 1, 2013

(51) Int. Cl.
*B60H 1/26* (2006.01)
*F16D 65/847* (2006.01)

(52) U.S. Cl.
USPC .......... 280/727; 188/264 AA; 165/44; 301/6.3

(58) Field of Classification Search
USPC ............... 280/855, 727; 180/68.2, 68.1, 68.3; 165/44, 41, 104.19, 104.34; 123/41.58, 123/41.59, 41.56; 188/264 R, 264 A, 188/264 AA, 71.6; 301/6.3
See application file for complete search history.

(56) References Cited

U.S. PATENT DOCUMENTS

| | | | | |
|---|---|---|---|---|
| 3,251,437 | A * | 5/1966 | Moyer et al. | 188/264 AA |
| 4,593,953 | A * | 6/1986 | Baba et al. | 301/6.3 |
| 4,772,299 | A * | 9/1988 | Bogusz | 55/385.3 |
| 6,045,197 | A * | 4/2000 | McGaugh | 303/1 |
| 7,198,139 | B2 * | 4/2007 | Wilson et al. | 188/264 AA |
| 7,600,615 | B2 * | 10/2009 | Ramsay et al. | 188/264 AA |
| 7,886,859 | B2 * | 2/2011 | Caldirola | 180/68.2 |
| 8,474,557 | B2 * | 7/2013 | Wolf | 180/68.2 |
| 8,562,023 | B2 * | 10/2013 | Hino | 280/855 |
| 2005/0145447 | A1 * | 7/2005 | Nowak et al. | 188/71.6 |
| 2009/0223757 | A1 * | 9/2009 | Ballard | 188/264 R |
| 2010/0258385 | A1 * | 10/2010 | Sabelstrom et al. | 188/71.6 |

\* cited by examiner

*Primary Examiner* — Drew Brown
(74) *Attorney, Agent, or Firm* — Reising Ethington P.C.

(57) ABSTRACT

An inlet, positioned to access the flow of air passing around and under a moving vehicle, draws in air which is conveyed through a duct and discharged to cool a brake on a vehicle. The inlet has a closure so that access of cooling air may be denied when the brake temperature is less than a predetermined temperature and opened only when the brake temperature exceeds that predetermined temperature. The closure is operated by a temperature-operated actuator. In embodiments the actuator may be suitably positioned to sense a temperature representative of the brake temperature and to incorporate a thermally activated phase change, active or smart material preselected to operate the inlet closure when the sensed brake temperature exceeds the predetermined temperature.

24 Claims, 8 Drawing Sheets

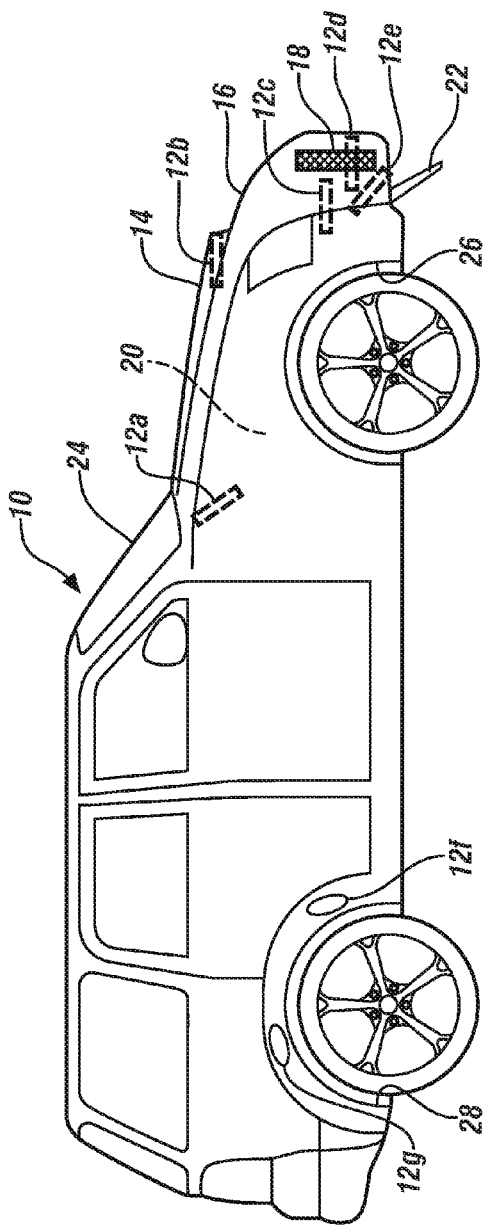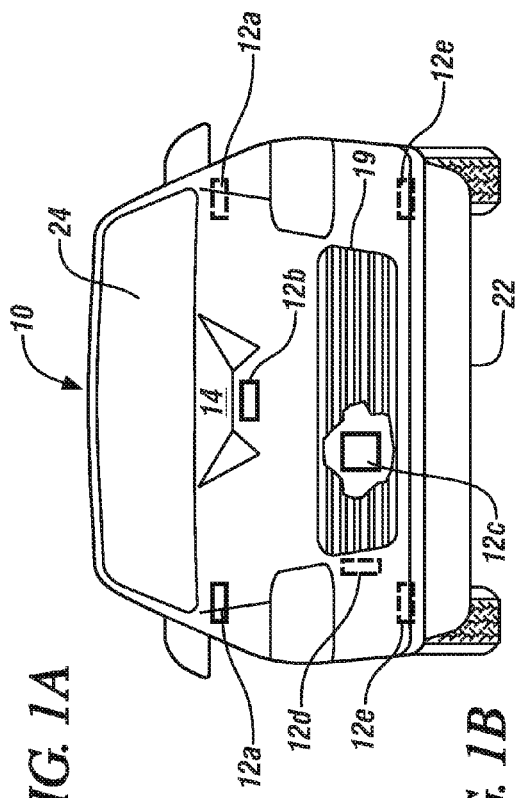

VEHICLE BRAKE COOLING SYSTEM

TECHNICAL FIELD

This disclosure pertains to a passive or unpowered, closeable duct system for directing ambient air, which is flowing around a moving automotive vehicle, to brakes on the wheels of the vehicle. More specifically, an actuator incorporating a reversible temperature sensitive active material, is used to both sense the brake temperature and to open the duct system to the vehicle air flow to maintain the brake temperature in a preferred operating range.

BACKGROUND OF THE INVENTION

Modern automotive vehicles typically have hydraulically actuated brakes on both the front and rear wheels of the vehicle. In vehicle disc brake systems, the hub of the vehicle wheel is mounted to an axially concentric, circular disc formed of a thermally conductive and wear resistant metal. A brake caliper, fixed to the vehicle, fits around a sector of the circular disc. When a vehicle operator steps on the brake pedal, hydraulic fluid is pressurized in a brake hose connected to the brake caliper and forces friction material pads of the brake caliper against both sides of the rotating wheel disc. The frictional engagement between the caliper pads and the rotating disc serves to slow, and possibly stop, the vehicle wheel. In drum brake systems, the vehicle wheel has an axially concentric, circular metal drum surface of thermally conductive and wear resistant metal. When braking is called for, pressurized hydraulic fluid in a brake hose forces arcuate brake linings of suitable friction material outwardly against the wheel drum, to again slow, and possibly stop, the vehicle wheel.

For styling, and to control the dispersion of sand, mud, liquids, and other road spray picked up by the rotating tire, vehicle wheels are generally partially enclosed within the vehicle body within a wheel well. The wheel well is a generally circular, partially closed cavity, open at its underside and at a vehicle fender or quarter panel and extending part-way into the vehicle body. Contained within the wheel well will be the wheel, brake assembly and, often, some suspension components such as springs and shock absorbers. The wheel well is sized to accommodate the wheel and tire in all configurations which they may adopt and so its design admits of the expected range of tire movements. These may include the suspension travel and, for the front wheels, the expected range of angular inclinations on turning the steering wheel. Commonly the wheel well will be generally closed at the vehicle interior and around an appreciable portion of the tire circumference.

Generally air flow around a moving vehicle contributes significantly to the cooling of brake disc and brake drum surfaces when they are heated by the repeated wheel braking actions of normal driving. This airflow is usually more than sufficient to cool brake discs, drums, and friction materials under most commonly-experienced driving conditions, although some extra operator care might be required when towing a trailer or when driving in mountainous regions with long, steep grades. However, vehicle hood, roof, rear deck, and side surfaces are being designed with greater emphasis on reducing vehicle drag. Of course, some air flow is admitted under hood and into the engine compartment for air flow through the radiator for engine cooling. This air may also cool the front wheel brakes as it flows out of the engine compartment and under the moving vehicle. An appreciable portion, of the drag experienced by a vehicle may arise from the air flowing under the floor of the vehicle passenger compartment and interacting with the moving wheels. In many vehicles this may contribute up to about 30% or more of the total drag. Hence, more attention has been paid to smoothing underfloor air flow and minimizing interaction of the airflow with the wheels. Many vehicles are fitted with an air dam or air flow director below the front bumper for directing air flow under a moving vehicle. This improved underfloor air flow and redirection of airflow from the wheels sometimes reduces the flow of cooling air against frictionally heated brake member surfaces.

There is therefore a need in some vehicle applications for a vehicle brake cooling system which is compatible with vehicle designs which promote a low vehicle drag coefficient.

SUMMARY OF THE INVENTION

This invention provides a closeable air flow duct system incorporating a thermally activated active or smart material actuator for location on a vehicle for maintaining the brake temperature in a preferred operating range. The duct system may direct a stream of cooling air flowing around a vehicle surface to the braking mechanism on a vehicle wheel as required. The active material actuator, which also serves as a temperature sensor, responds to the brake temperature and enables or suppresses passage of air as appropriate. The duct member has an inlet to be located for receiving flowing air at a pressure sufficient for transport of the air stream to the wheel and it disc brake system, or other brake system. The cross-sectional area of the duct is sized along its length to accommodate the flow of ambient cooling air. The outlet of the air flow duct preferably directs the flow of air against a heated surface of the brake member. In many embodiments of the invention, the duct may be an extruded or molded tube-like structure of suitable polymer composition.

The inlet of the duct will generally be placed and attached at a location of appreciable air flow around the moving vehicle. An example of such a location is at an air dam directing air flow under the engine compartment and passenger compartment floor. At such a duct inlet location, an open duct and inlet may have an adverse effect on the local streamlined air flow. Accordingly, the inlet or the duct will be closed by a closure member when brake cooling is not required. The closure may be positioned and adapted to cooperate with the inlet and/or duct to promote streamlined flow around the inlet.

The opening and closing of the closure is effected by an actuator incorporating an active material which undergoes a phase change at a predetermined temperature. The phase changing active material, in addition to operating the closure, also serves to determine the timing and duration of such operation. The active material is placed in suitable heat transfer relationship with a disc caliper or other brake member so that it may sense the brake temperature, or a temperature indicative of brake temperature, and open and close the closure to provide cooling air, as required, to maintain the temperature of the wheel brake system in a preferred range. A suitable shape memory metal alloy, a suitable hydrocarbon paraffin composition, or the like, is chosen to experience a suitable shape change for actuating the opening of the duct inlet only when the sensed temperature of the brake exceeds a predetermined temperature and indicates a need for additional flow of cooling air. The shape change or other transformation of the temperature sensitive active material on heating serves to open the closure. On cooling to below the predetermined temperature, the phase change is reversed and a biasing force is applied to restore the phase change material to its original low temperature configuration. The biasing force, often applied by a spring, also closes the closure to shut off flow of cooling air. Thus the closure and actuator are restored to a condition in which they may again operate to provide supplementary cooling air when called upon to do so.

In an embodiment in which the actuator and closure assembly are positioned close to the brake assembly the actuator may operate the closure directly. In another embodiment, more tolerant of packaging considerations, the actuator may operate the inlet through a linkage or cable which extends from the active material located near the wheel and brake to the duct inlet. A brake cooling duct system, as described, is preferably used at least on each of the front wheel brakes and may also be used with the rear wheel brakes.

In preferred embodiments of the invention, cooling air flows, when required, through an inlet and conveyed, through a suitable duct, to the wheel well. The cooling air flow may be discharged into the wheel well for general cooling of the brake, or, more preferably, directed against a specific heated brake surface. The cooling air may be drawn from the exterior of the vehicle, preferably from regions of increased air pressure, or from the engine compartment. In the case of a disc brake, the cooling air may be directed against the rotor surface or, when vented rotors are used, to the inner diameter of the inner rotor surface. For a drum brake the cooling air may be directed at the drum. The opening cross-sectional area of the inlet may vary depending on the application and vehicle design, but, in many applications, may be about 12000 mm$^2$ or less in cross-sectional area.

The brake temperature may be measured directly or inferred from temperatures taken at other, preferably non-rotating, locations on, or in, the brake system. These locations may include, in a disc brake system, the brake caliper, and in a drum brake, the backing plate. In both brake systems the temperature of the brake fluid may be used as an indicator of brake temperature.

The cooling air may be drawn from any suitable location on the vehicle body which may include, without limitation, body panels, the hood, rear fascia, the roof, bumpers, chassis, frame and sub-frame components, pillars, and the like. Preferably the air originates in a zone of higher pressure so that a pressure gradient may be established to naturally urge the cooling air to the brake without need for pumps or other air-handling systems. Suitable high pressure locations may be located: in the radiator airflow, either ahead of the radiator or behind the radiator in the engine compartment; in the stagnant zone between a front air dam and the vehicle body; and at the base of the windshield, among others. In an exemplary embodiment a suitable high pressure location may be identified close to the brake to be cooled to enable use of shorter ducts of say, about 700 millimeters in length or less. However, it will be appreciated that the duct geometry and dimensions may vary considerably from vehicle to vehicle due to design and packaging constraints.

The closure may be one of a butterfly valve, a gate valve, a ball valve, a louver valve, an iris valve, a plug valve, or a uni-morph or bi-morph bending flap, among others. The closure may be located in the inlet or the duct. Provided the closure provides good sealing with minimal leakage to prevent flow of cooling air when closed, placement of the closure is not critical. But it is generally preferred to position the closure no more than a distance corresponding to about 30% of the duct length from the inlet.

Shape memory alloys undergo a shape change as they metallurgically transform from one crystal structure to another when heated to a first temperature. The shape change may be undone or reversed, substantially completely, by cooling the shape-changed SMA to a second, lower temperature while under the influence of a biasing force, frequently applied by a spring or a suitable deadweight. The higher temperature phase is referred to as austenite and the low temperature phase as martensite. This nomenclature is used irrespective of the composition of the SMA.

Paraffin undergoes a significant volume change, as great as 40% in current common commercial forms, on melting and, if confined in an otherwise closed container with a moveable plunger, may displace the plunger on melting and so serve as an actuator. Reversibility is achieved in the case of a sealed container by cooling the paraffin to the smaller volume solid form which causes the plunger to return to its starting position, possibly with the assistance of a biasing spring.

In brake operation, heating results from the frictional interaction of the friction material with a metal surface. In the case of a disc brake, these are the brake pad and the brake rotor. The heat is then conducted and convected away from the pad and rotor to establish within the brake structure, a temperature profile. Thus a measured 'brake temperature' may vary depending on where the measurement is made. However, experimentally and/or analytically any measured temperature may be related to the pad/rotor temperature, or in the case of a drum brake, the drum/brake lining temperature. So a preferred maximum pad/rotor temperature may be associated with a corresponding, predetermined, temperature measured at any brake structure location of interest. Typically, such locations of interest are those at which the actuator is placed.

Appropriately, an actuator positioned on and in thermal communication with the brake, for example an SMA actuator, may be selected which may begin to undergo its shape change, that is transform from martensite to austenite, when the brake temperature approaches or reaches its predetermined temperature. The temperatures at which SMAs begin to transform may be adjusted by choice of alloy system, the alloy composition within that system and the stress level within the material. For example Nickel-Titanium alloys are one, well-known, family of SMA alloys, but, within this family, the transformation temperature varies with the atomic proportions of nickel and titanium. With further increase in temperature the SMA may achieve a substantially complete transformation to austenite and fully realize its designed shape change. The shape change of the SMA will induce a displacement in the SMA. When the displacement is communicated to the closure, directly or by a suitable connection such as a linkage or a cable, the closure will open, enabling cooling air to pass into ductwork where it may be conveyed to the wheel well and there discharged to cool the brake. Preferably the cooling air may be applied directly to the brake system. When the sensed brake temperature decreases to less than the predetermined threshold brake temperature, the SMA begins to transform to its martensite phase. With continued cooling and reduction in brake temperature the transformation will progressively render a substantially complete transformation to martensite. In its martensite phase the SMA may be deformed by a biasing spring causing the inlet to close and re-adopt a lower drag configuration.

A suitably-positioned paraffin actuator may undergo repeated melting and solidification of the paraffin wax to enable repeated inlet openings and closings. The operating temperature of the paraffin actuator may be adjusted by controlling carbon number(s) of the chosen paraffin or paraffin mixture so that appropriate response may be achieved in a number of mounting locations.

Both an SMA and a paraffin actuator exhibit some hysteresis, that is, the forward transformation will occur at a higher temperature than the reverse transformation. This is desirable since it assures that the inlet will open at a higher temperature than the temperature at which it will close and so minimize 'hunting' or repeated cycling about a control point. If additional hysteresis is required or preferred, a lost motion mechanism may be incorporated into the actuator-inlet linkage.

Both SMA and paraffin actuators operate quasi-linearly so that the closure will progressively open and close as the actuators cycle between their fully retracted and fully extended positions. If it is preferred to operate the inlet in a more 'on-off' mode in which the inlet rapidly transitions from fully closed to fully opened and back again, a bi-stable, or 'snap-action' device may be incorporated in any linkage.

In the above embodiments, operation of the closure is passive, or unpowered. No external power source, such as for example a vehicle battery, is required. The actuator serves both to operate the closure and to sense the brake temperature so that the actuator may determine when brake heating is sufficient to trigger opening of the closure and the time during which the closure remains open to admit a cooling air flow.

BRIEF DESCRIPTION OF THE DRAWINGS

FIGS. 1A and 1B show, in side and front view respectively, a representation of a vehicle illustrating some suitable placements for brake cooling inlets. FIG. 1C illustrates application of cooling to a left front brake assembly where 'left' and 'right' identify directions as perceived by a seated vehicle occupant.

FIG. 2A shows, in isolation, an inlet, closure device and associated duct for gathering and conveying cooling air to a right front brake viewed looking inward toward the vehicle centerline. FIG. 2B generally shows the same view of the brake cooling system shown in FIG. 1C, that is for a left front brake, while illustrating its relation to other vehicle components. FIG. 2C shows a view of a cooling system for a right front brake viewed from outside the vehicle and looking inward toward the vehicle centerline. FIG. 2D shows a view of the inlet and an associate portion of the vehicle body when viewed in a direction approximately aligned with the axis of the duct.

DESCRIPTION OF PREFERRED EMBODIMENTS

Figure 1C:
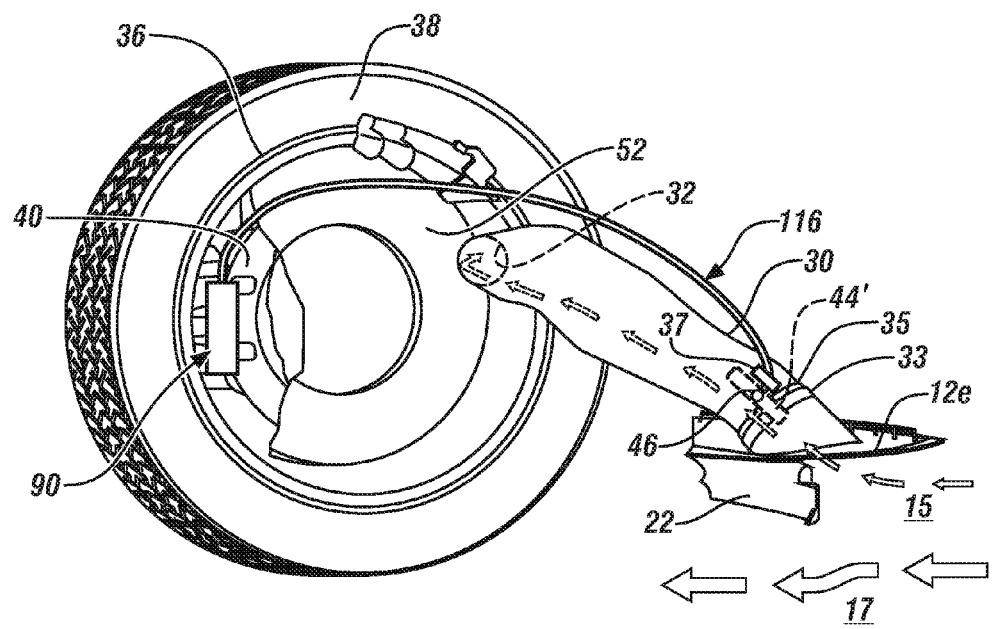
FIG. 1C illustrates a representative brake cooling system, viewed looking outward from the vehicle centerline, shown in isolation.

The invention provides methods of providing supplementary cooling air to the brakes of a vehicle when the brakes attain and exceed a predetermined elevated temperature.

In practice of the invention, an inlet is positioned at a location on the vehicle body which experiences higher air pressure than the wheel wells. In an embodiment the inlet is connected to a duct extending into a wheel well so that air will flow, first through the inlet and then the duct, to the wheel well and, preferably, be directed onto at least one of the vehicle brakes. A closure, suited for enabling or denying passage of air, is located in the inlet or the duct so that the flow of air to the wheel well or to the brakes may be provided only when required. The operation of the closure is under the control of a temperature sensitive actuator in thermal communication with the brake which may open the closure if the brake temperature exceeds a predetermined temperature. So long as the brake temperature remains less than the predetermined threshold temperature, the closure will be closed and deny access of air from the inlet to the wheel well.

The inlet may be a shaped member mounted on the outer surface of the vehicle body. The inlet may be secured to and supported by the vehicle body or may be secured to a structural member underlying the vehicle body. The inlet may serve to support the duct or the duct may be separately supported, typically on the vehicle structure. The inlet may be fabricated of a suitable polymeric material and secured to the vehicle by mechanical fasteners such as self-tapping screws, rivets, clips or other means well known to those skilled in the art. The inlet is intended to smoothly redirect some of the airflow around the vehicle body and prepare the airflow, with minimal disturbance, for entry into a duct which will convey it to a brake. The inlet may be molded and shaped to generally conform to the vehicle's exterior contours and may be color-matched to the vehicle paint to foster an aesthetically-pleasing appearance. In some embodiments the inlet may be integral with a molded vehicle body component or after-market accessory such as a splitter or an air dam. In some embodiments, the inlet and duct may be formed as a unitary body.

The terminal end of the duct, that is, the end not attached to the inlet, is positioned to discharge the airflow where it may serve to cool a vehicle brake. In general, the brake, its associated wheel, and generally several suspension components will be partially enclosed in a wheel well, a volume extending inwardly from an opening in each of the vehicle body sides to form a generally semi-circular, partially open cavity. In some embodiments the cooler airflow may be discharged generally into the wheel well, but preferably the duct outlet is advantageously positioned so that the outflowing cool air may be ported directly to the brakes to provide the most effective supplementary brake cooling.

Air may be drawn into the duct from any convenient location on the vehicle body. In many vehicles the wheel wells are subject to a reduced pressure so that cooling air drawn may be drawn from many body locations and 'sucked into' the wheel wells. It is preferred, to maximize flow, that the inlet be located in a region of the body where the air pressure is greater than the pressure which obtains in the wheel wells. As shown on vehicle 10 shown in FIGS. 1A and 1B, inlets 12a-g may be suitably located in a number of locations. Inlet 12a accepts ram air from the base of windshield 24. Inlet 12b accepts ram air from hood scoop 14 mounted in hood 16. Inlet 12c accepts air from engine compartment 20, which, although warmer than ambient air, is significantly cooler than the brake temperature. Inlet 12d is positioned within radiator opening 19 upstream of, or adjacent to, radiator 18. Inlet 12e is mounted on the body underside, upstream of air dam 22. Inlet 12f may be a scoop located forward of the rear wheel while inlet 12g may be positioned above the wheel in the rear fender.

Ducting, not shown, may be used to connect any of inlets 12a-g to either or both of pairs of wheel wells 26, 28. It will be appreciated that in some vehicles, it may be appropriate to employ individual inlets for each brake while in other vehicles the flow from a single inlet may be split and directed, via multiple ducts to a like multiplicity of brakes. In applications where all four brakes are cooled a combination of these approaches may also be used. Current design practice results in ducts that usually do not exceed 700 millimeters in length and inlet openings of 12000 mm$^2$ for each brake. But ducts with other lengths and inlet areas may be employed depending based on cooling and packaging requirements. Generally the duct geometry (not shown) should conform to good practice. That is, the duct should minimize bends and changes in cross-sectional area and preferably have a smooth interior surface to minimize frictional losses. Where packaging constraints necessitate deviation from these guidelines any bends should be sweeping and changes in cross-sectional area gradual.

An exemplary embodiment of the invention is shown, in isolation, in the outwardly-directed view, that is, looking from the vehicle centerline in the direction of the vehicle exterior, of FIG. 1C. In this embodiment, a left front brake caliper 40 is arranged to engage disc rotor 52 mounted substantially concentrically with tire 38 and wheel 36. A thermally-actuated actuator 90 is mounted on, and in thermal communication with, caliper 40. Actuator 90 is connected by cable 116 to a mechanism 37, details not shown, which may enable an open closure 44'. In this embodiment the closure is shown as a butterfly valve connected to and pivoting with shaft 46, so that mechanism 37 would enable rotation of shaft 46. The oncoming airflow is divided into flows. Airflow 17 directed toward the lower edge of air dam 22, shown partially cut away, is deflected downward and continues on a path, external to the vehicle which will carry it under the vehicle. Airflow 15, shown directed toward the high pressure region formed at the junction of air dam 22 and the portion of vehicle body to which it is attached (not shown), is collected by inlet 12e. Airflow 15 then passes through open closure 44' and along duct 30 before discharging at 32 to cool disc brake rotor 52.

In this embodiment duct 30 and inlet 12e are separate components. A short length of airflow receiving end of duct 30, not shown, is sized and shaped to slidably enter and engage lip 35 of inlet 12e. Alternatively, not shown, the duct-inlet joint may be made by having lip 35 and a suitable portion of inlet 12e slidably enter and engage the airflow-receiving end of duct 30. In either embodiment, duct 30 and inlet 12e may be secured to one another using, for example using hose clamp 33. Alternate fastenings may include complementary molded-in features to enable a bayonet-lock or mechanical fasteners such as screws or rivets. In this embodiment open closure 44' is located in duct 30.

Figure 2A:
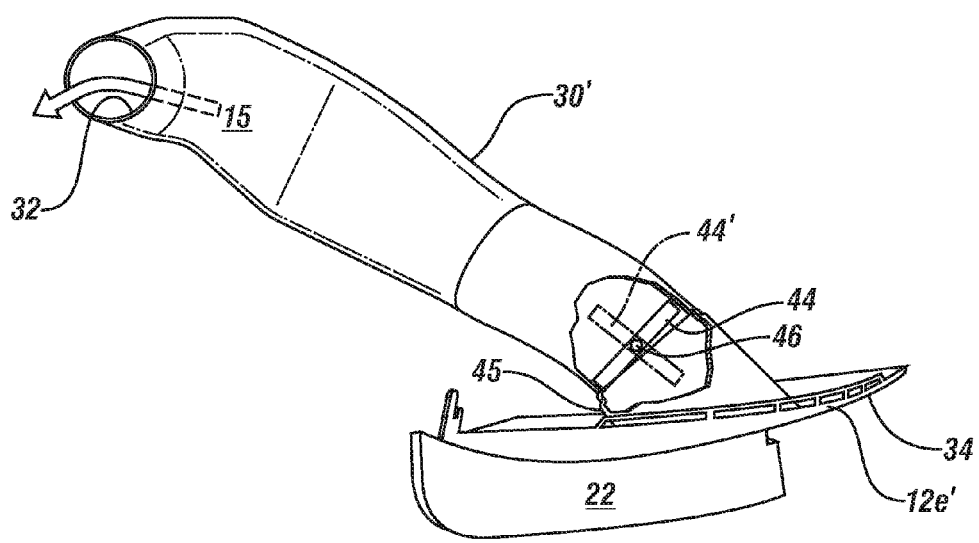
FIGS. 2A-D show further details of the brake cooling system shown in FIG. 1C.

Further details of an embodiment of the inlet and its associated duct, are shown in the inwardly-directed side view of FIG. 2A, reflecting the view of a right brake to more clearly illustrate the redirection of airflow 15 as it approaches opening 32. In the embodiment shown in FIG. 2A duct 30' and inlet 12e' are shown as a one piece unit with no mechanical attachment therebetween. For clarity, mechanism 37 and cable 116 are not shown in this view.

Figure 2B:
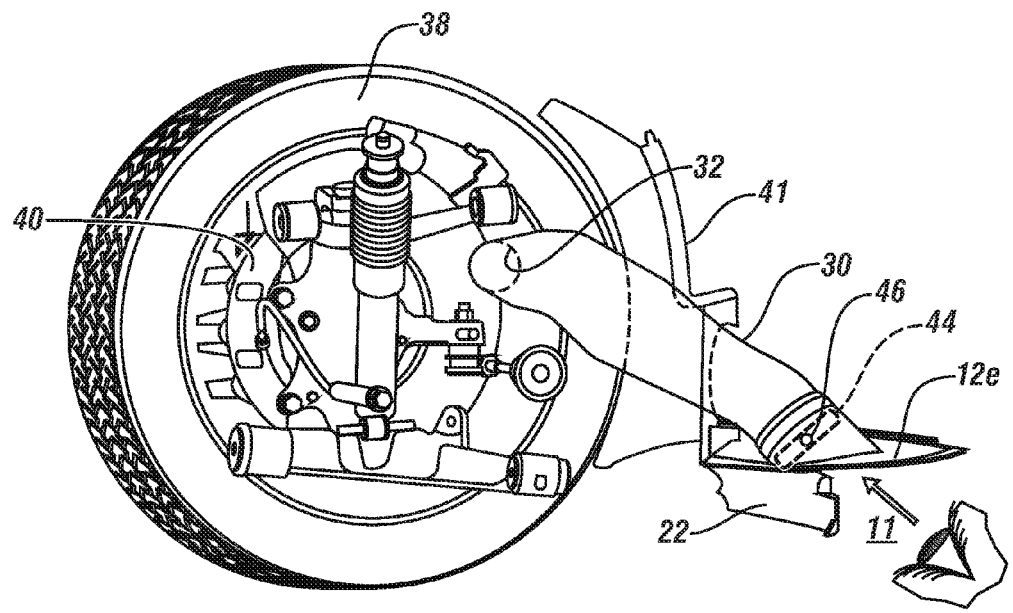

In its 'closed' position 44, the closure may deny access of cooling air, while in its 'open' position 44' enable substantially free passage of cooling air to disc 52. Again, the closure is shown as butterfly valve pivoting with supporting shaft 46. Of course, the closure may also adopt a plurality of positions intermediate between closed position 44 and open position 44'. Hence, under the influence of an actuator which operates to progressively rotate shaft 46, the closure shown will also operate progressively, generally smoothly transitioning from its closed to open configurations and vice versa as required. Inlet 12e' has an exterior surface 34 and a smoothly varying throat section 45, intended to gather and admit air without inducing undue turbulence. FIG. 2B shows a view generally similar to the left front brake view of FIG. 1C but with some (unlabelled) suspension components and a portion of vehicle structure around the wheel well at 41 to illustrate the packaging issues raised by the integration of such a system into a vehicle. In FIG. 2B closed closure 44 and its associated shaft 46 are shown positioned in inlet 12e.

Figure 2C:
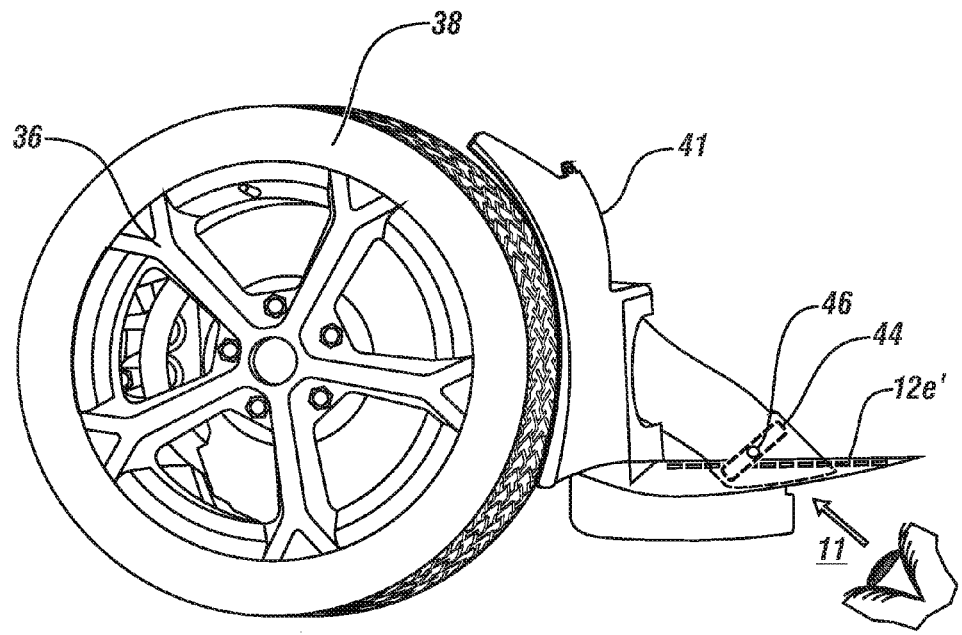
Figure 2D:
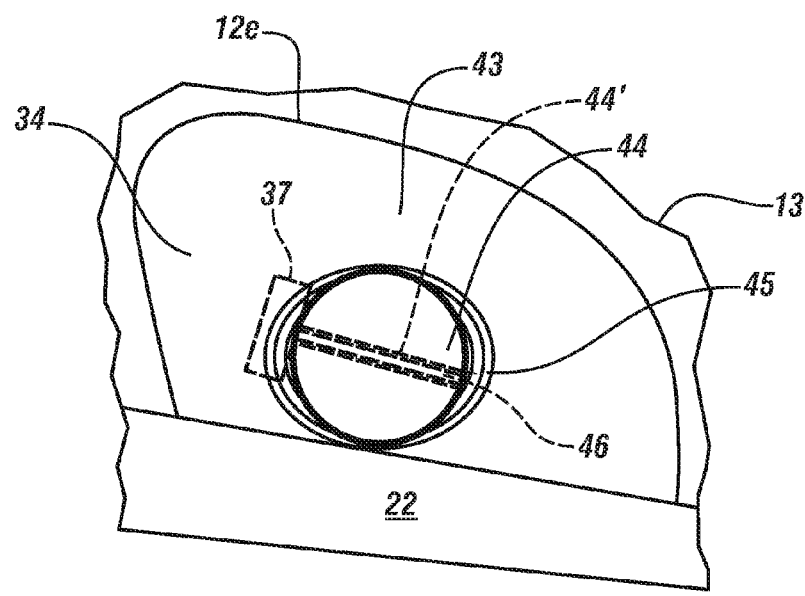

FIG. 2C shows the view corresponding to the right wheel view of FIG. 2B, but in a direction from outside the vehicle to further illustrate the integration of the system into the vehicle. In this embodiment, again incorporating a unitary duct-inlet combination, closed closure 44 and shaft 46 are depicted as located in the inlet 12e' portion of the combination. FIG. 2D shows a head-on view of inlet 12e, that is generally along arrow 11 in FIGS. 2B and 2C to illustrate the relative placement of inlet 12e and air dam 22 and to further illustrate the smooth transition from surface 34 to throat 45. A representative placement for mechanism 37, which may be mounted on either of duct 30 or 30' (not shown in this view) is illustrated. It will be appreciated that the structure and placement of mechanism 37 may vary with choice of closure.

In this embodiment inlet 12e is a discrete structure with a surface 34, suitably attached to body structure 13 and abutting air dam 22. Inlet 12e has a faired throat section 45 which smoothly transitions to a generally circular opening 43 closable by a suitable closure, for example a butterfly valve. Open closure 44' provides minimal impediment to airflow, enabling flow of cooling air through duct 30 and discharge opening 32 to brake disc 52. In this embodiment inlet 12e is a discrete entity, separate from the adjacent body structure 13. In other embodiments where an inlet is located at a molded polymer vehicle component, such as a front fascia, it may be molded into the component as an integral feature.

The depiction of the closure as a butterfly valve is exemplary only and alternative closure devices may be employed. These may include, for example, a ball valve, a gate valve, a louver valve, an iris valve and a plug valve among others. Each of these inlet valves may serve to progressively pass or block airflow as required when combined with an actuator capable of providing sufficient force and range of motion to cycle the valve from its closed to its open position and vice versa. Thus the choice of valve type should be informed by, and compatible with, the range of motion available from a chosen actuator. Of course, each of these closure types operates progressively, that is, it affords opportunity for a plurality of configurations intermediate between 'open' and 'closed'. These intermediate configurations will throttle the airflow and reduce the volume of cooling air conveyed to the brakes. Thus, when brake cooling is required it is generally preferred that the closure quickly transition from its closed to open configurations.

The closeable inlet affords opportunity to manage vehicle drag since the vehicle drag coefficient is lowered when the inlets are closed versus open. Preferably the closure is located close to the inlet opening, suitably within the span of about 30% of the duct length downstream of the inlet. But, with good closure sealing, comparable improvements in drag coefficient may obtain even when the closure is positioned at, or near, the terminal end of the duct and discharge opening 32 of FIG. 1C.

In embodiments, suitable actuators may be based on smart or active materials such as shape memory alloys (SMAs) or paraffins. These actuators may be operated in a passive mode, that is, without application of external power, and may operate reliably over many thousands or hundreds of thousands of cycles. Advantageously such actuators may also serve as temperature sensors. These actuators are responsive to changes in temperature and may be selected to operate the inlet closure only when the brake temperature achieves a predetermined elevated temperature. The changes occurring during a temperature rise may, with appropriate design of the actuator, be reversed on cooling. Hence, the inlet may be maintained in its closure-open, higher drag coefficient configuration, for only as long as is needed to maintain the brake temperature within a preferred operating temperature range. So with this approach the vehicle is maintained in its preferred, lower-drag, closure-closed configuration unless the supplementary brake cooling air delivered by the inlet and duct is required to control brake temperatures under particularly taxing braking conditions.

SMAs are materials which transform from one phase to another at relatively modest temperatures, generally of less than 300° C. or so. The two phases have markedly different properties with the high temperature austenite phase being strong and stiff, while the martensite low temperature phase is weaker and less stiff. Transformation occurs over a narrow temperature range which depends on the composition of the selected SMA alloy. By appropriate choice of SMA composition, the transformation temperature may be readily chosen to fall within a range of 50° C. to 250° C. or so, to assure that the closure does not open until the brake and actuator temperature exceed ambient temperatures.

In operation a suitably shaped SMA alloy is annealed at elevated temperatures much greater than the martensite to austenite transformation temperature. When cooled below the austenite to martensite transformation temperature the alloy will adopt its martensite phase and be readily deformable. A controlled deformation imparting less than about 8% strain which may be applied, for example, by a biasing spring or a dead weight, may reshape the SMA into a second shape. This deformed shape will be maintained for as long as the SMA retains its lower temperature martensite structure, but, remarkably, the original shape may be essentially completely recovered when the alloy again adopts its austenite phase.

On heating the deformed SMA to a temperature equal to, or greater than, its martensite to austenite transformation temperature, the SMA will transform to its stronger, stiffer higher temperature austenite phase. As it transforms, it reverses the deformation, overcoming the influence of the biasing spring or deadweight as it does so, to substantially restore the SMA to its initial shape and configuration. Provided the strain imposed on the SMA in its martensite phase is limited to no more than about 8% strain this cycle of transformation, from austenite to martensite and vice versa, may be repeated, nearly indefinitely. Further, in transforming from martensite to austenite the SMA generates appreciable force, above and beyond that necessary to overcome the biasing spring. This force, when harnessed and suitably conveyed to a mechanism, may operate or actuate a device such as the inlet valve closure described above. On cooling to below the transformation temperature the biasing spring will serve to substantially restore the actuator to its starting configuration and, in so doing, will reverse the operation of the mechanism.

Often SMAs used in actuators are in the form of wires, braids, tapes, cables or other such elongated geometries. These configurations may also be employed in the embodiments described here. However the need to minimize the maximum strain to 8% or so may make actuators fabricated of linear arrangements of such forms bulky when large displacements are required. In addition, it may be challenging to ensure, in the presence of a temperature gradient, that the entire length of an extensive actuator will experience the same rise in temperature. Any non-transforming length of the SMA will proportionately reduce the actuator displacement and may lead to an inconsistent actuator response, particularly when only a marginal need for supplementary cooling exists. However, more compact designs, less affected by thermal gradients and more readily packaged, may be developed by winding the wire, or similar elongated form of SMA, into the shape of a coil spring. Such a design is employed in the SMA actuator described in later sections.

In some SMA actuators the SMA is a component of a composite structure. For example, in a uni-morph device a layer of SMA may be deposited on and bonded to, a thin compliant substrate such as a spring steel, for example by high temperature vapor deposition. Now, when the SMA changes in length it applies a moment to the substrate, causing it to flex. The behavior may be further modified by the choice of deposition temperature which may establish a flex in the substrate due to differences in coefficient of thermal expansion of substrate and deposit. When the uni-morph is in the form of strip secured at only one end, the free end will deflect and may serve to open a valve. In the form of a uni-morph disc the center will arch. Bi-morph configurations incorporating two SMA alloys deposited on either side of a substrate, each deposited at a different temperature and having differing transformation temperatures may also be used where greater displacements or more complex motions are desired. In some embodiments a uni-morph or bi-morph may be shaped to conform to a duct interior and itself used as the closure. In this embodiment the deflection of the uni-morph or bi-morph, on heating, would reshape uni-morph or bi-morph so that it no longer seals against the duct wall, or against a sealing feature or features attached to or integrated with the duct wall, to thereby enable passage of cooling air through the duct.

The utility of SMA actuators in this application depends upon the availability of a series of SMA alloys with a range of transformation temperatures appropriate to the need to respond at a temperature appropriate to a need for supplementary brake cooling. Fortunately, shape memory behavior has been observed in a large number of alloy systems including Ni—Ti, In—Ti, Ni—Ga, Cu—Zn—Al, Cu—Al—Ni, Ti—Nb, Au—Cu—Zn, Cu—Zn—Sn, Cu—Zn—Si, Ag—Cd, Cu—Sn, Cu—Zn—Ga, Ni—Al, Fe—Pt, Ti—Pd—Ni, Fe—Mn—Si, Au—Zn, and Cu—Zn and phase transformation may occur over the temperature range of from between about −(minus 100°) C. to about +150° C. or so, with specialized alloys transforming at up to about 250° C. Although such theory is not relied upon, there is some indication that the transformation temperature may be correlated with the ratio of valence electrons per atom.

Of these many compositions, alloys of nickel and titanium in near-equi-atomic proportion enjoy the widest use, but, even in this alloy system, minor changes in composition may induce significant differences in transformation temperature. For example changing the nickel/titanium ratio of the alloy from about 0.96 to about 1.04 may change the transformation temperature from about plus 70° C. to about minus 100° C. Thus it is feasible to 'tailor' the properties of an SMA so that transformation occurs at whatever pre-selected temperature best correlates with an impending need for supplementary brake cooling. Typically, suitable SMAs will have transformation temperatures ranging from about 50° C. to 250° C.

Commonly, disc brakes are almost universally used for front brakes. While solid rotors may be used, it is more common, on the medium to large rotors used on heavier or higher performance vehicles to employ vented rotors. Vented rotors incorporate radial cooling passages located between the brake pad-contacting rotor surfaces which, under rotor rotation, function as air pumps to circulate air from the rotor center to the outside of the rotor. The preferred location of the duct outlet may vary depending on the type of rotor, vented or solid.

Drum brakes are not typically vented, and where supplementary cooling is to be applied to a drum brake the ducted air flow is most appropriately directed to the outer surface of the drum or hollow cylinder whose inner surface is engaged by the brake pads.

It will be appreciated that some of the brake system components, the rotor 52 of disc brakes 50 (shown in FIGS. 3A and B) and the drum 72 of drum brakes 70 (shown in FIG. 4) rotate and so the actuator may not be suitably mounted on these components. For accurate measurement of the pad temperature it may be desirable to position the sensor on the rotor- or drum-contacting surface of the pad 54 or lining 74, but since the pad/lining wears, such positioning is not feasible. Burying the sensor deeper in the pad/lining, distant from the rotor or drum, or, on shoe 76, may be feasible but, since these parts are consumable and replaced when pad/lining wear becomes unacceptable, this would be costly and inconvenient. For these reasons a preferred location for an actuator on a disc brake is on the brake caliper assembly 56. The actuator may also be mounted in, or integrated with, the caliper assembly or near the exposed rotor surface. On a drum brake the actuator may be mounted on either of hydraulic piston 80 or backing plate 82.

On disc brake caliper assembly 56 the actuator may be positioned on the upper surface 57 of the caliper support structure 58, or positioned in a suitable recess or cavity (not shown) in support structure 58. Of course, the actuator should be suitably mounted to the support structure so that the actuator is in good thermal communication with the caliper support. It will be appreciated that different locations on the brake system, and the caliper support in particular may heat at different rates so that the predetermined temperature indicative of a need for brake cooling may vary with actuator placement and require different actuator SMA compositions for different locations.

Figure 3A:
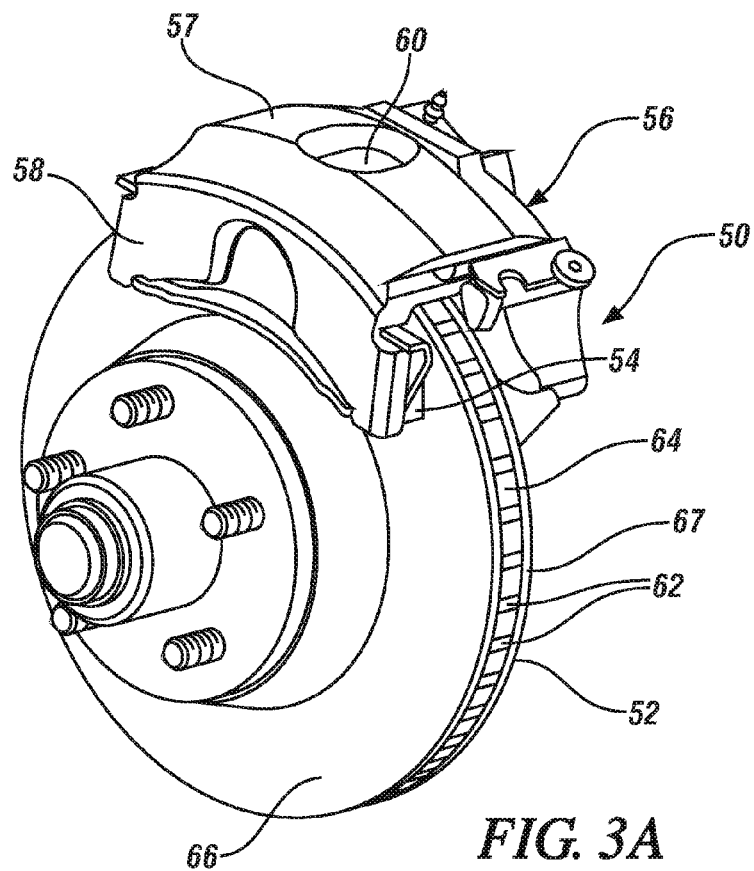
FIG. 3A shows, in perspective view, elements of a disc brake assembly positioned as they are mounted on a vehicle axle.
Figure 3B:
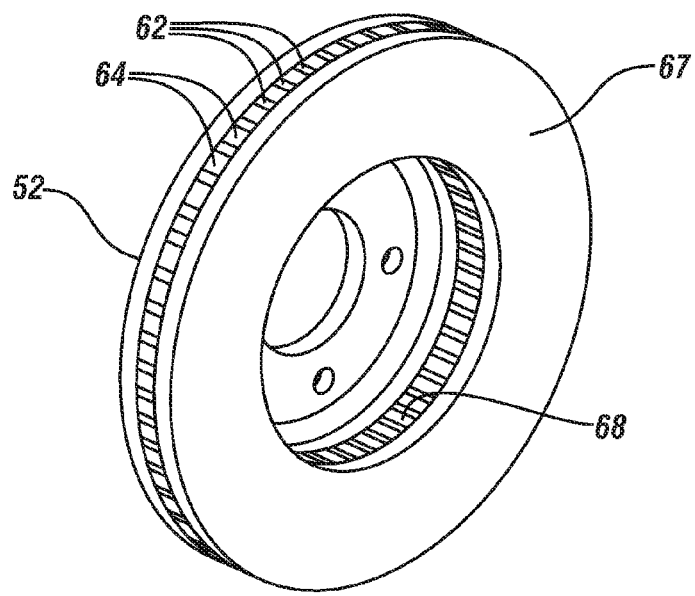
FIG. 3B shows the brake rotor in isolation and viewed from the opposing direction.
Figure 4:
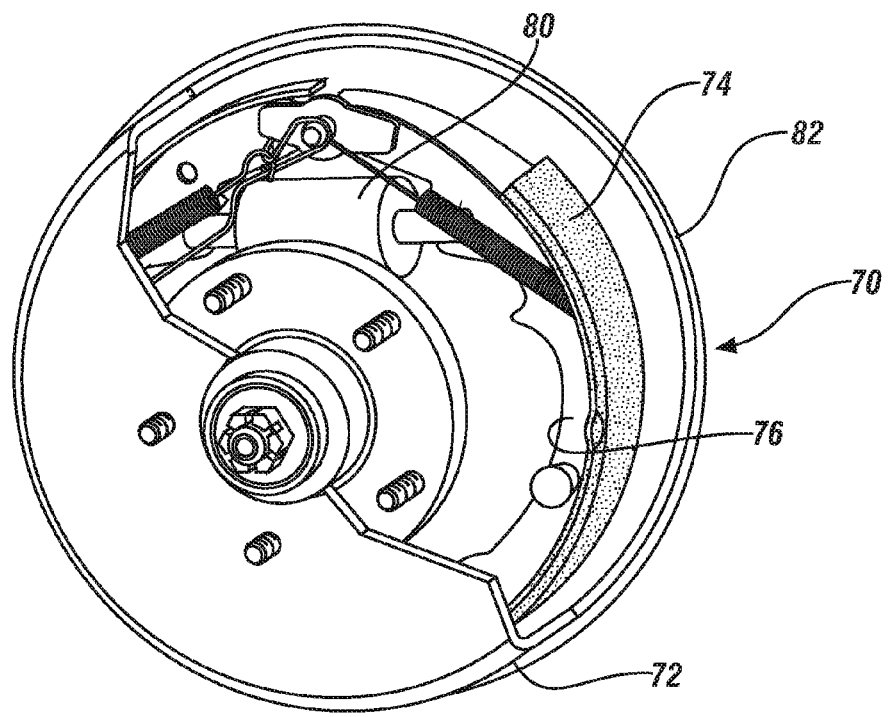
FIG. 4 shows, in perspective view with partial cutaway elements, a drum brake positioned as mounted on a vehicle axle.

As shown in FIGS. 3A and 3B, many rotors 52 have pad-contacting surfaces 66, 67 separated by ribs or vanes 62 with intervening channels terminating in a plurality of openings 64 at the outer periphery of the rotor. When the rotor 52 is rotating this internal vane-channel structure serves to pump cooling air, drawn through openings 68 (FIG. 3B) on the inner surface of the disc adjacent pad-contacting surface 67, through the rotor, before discharging it at openings 64. Many caliper support structures 58 therefore have an opening or gap on their upper surface, such as at 60 in FIG. 3A, to minimize any impediment to the heated air discharge. Thus, an actuator placed over opening 60, or a functionally equivalent opening of dissimilar geometry, would, provided the actuator itself did not excessively impede flow of the heated air, be heated directly by such heated air.

It will be appreciated that when vented discs like that shown in FIGS. 3A and 3B are employed it may be preferred to direct cooling toward inlet openings 68. However, when solid, non-vented discs are used it may be more effective to direct the cooling air toward the outer periphery of the disc, generally at the location contacted by the brake pads.

Figures 5A, 5B:
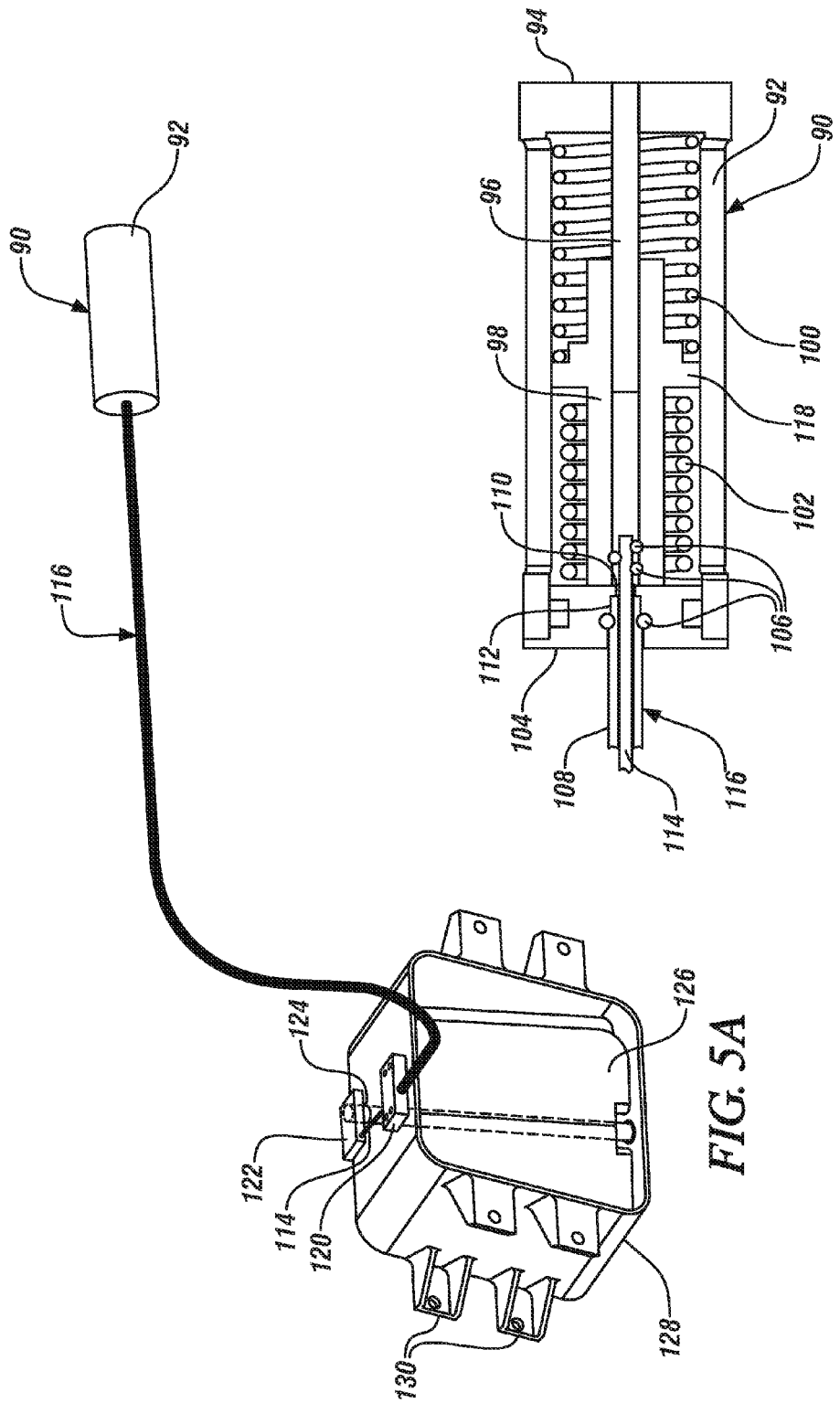
FIG. 5A shows a portion of a closeable vent system employing an SMA actuator.
FIG. 5B shows a representative SMA actuator, like that shown in FIG. 5A, employing an SMA coil spring.

A suitable SMA actuator 90 in conjunction with an appropriate closable inlet is shown in FIG. 5A and, in isolation and cross-section, in FIG. 5B. As is clear from the view of FIG. 5A, SMA actuator 90 is contained within a closed generally cylindrical case 92.

Generally cylindrical case 92 is terminated on its end faces by closed end cap 94 and on its opposing end by end cap 104 incorporating through-hole 110 sized to permit through-passage of wire 114 of cable 116. End cap 104 also incorporates recess 112, concentric with through-hole 110 and sized to accommodate cable sheath 108 of cable 116. Internal to actuator case 92, a slidable, flanged sleeve 98 is supported on the inner, cylindrical walls of case 92 and by guidepost 96 located on the cylinder axis of case 92. Slidable sleeve 98 partitions the interior cavity of case 92 into two portions. A first portion bounded by endcap 104, contains an SMA spring 102, here shown compressed and in its martensite phase. A second portion contains bias spring 100, here shown in its extended position. Each of SMA spring 102 and bias spring 100 acts on the opposing surfaces of flange portion 118 of slidable sleeve 98 so that sleeve 98 may be displaced by whichever of springs 102 and 100 is the stronger. Slidable sleeve 98 is sized, in its hollow portion which engages guidepost 96, to accept wire 114 of cable 116. Wire 114 may be secured and retained within this cavity in any suitable manner but is here shown, without limitation, as being restrained by engagement with mechanically interfering features 106. Similar mechanically interfering features, again without limitation, are shown as engaging and restraining sheath 108 of cable 116 to secure it within recess 112.

The operation, the actuator as shown at FIG. 5B is connected by cable 116 to at least that portion of a duct 128 incorporating a closure 126. At low temperatures, the configuration shown in FIG. 5B, bias spring 100 is able to overpower SMA spring 102, which is in its martensite phase, displacing sleeve 98 toward end cap 104. When the temperature of SMA spring 102 increases to the temperature at which it transforms to its austenite phase, SMA spring 102 can overpower bias spring 100 displacing sleeve 98 toward end cap 94 and displacing wire 114 as it does so. The displacement of wire 114 is communicated, through cable 116, to duct portion 128. At duct portion 128, sheath 108 is secured to block 120 and wire 114 is secured to lever 122 attached to shaft 124 of closure 126. Shaft 124 passes through appropriately-sized and positioned openings (not shown) in opposing walls of duct portion 128 so that the motion of wire 114 acting on lever 122 serves to rotate closure 126 about the axis of shaft 124 and open closure 126.

On cooling SMA spring 102 below its austenite to martensite transformation and restoring it to its weaker martensite phase, bias spring 100 may again overcome SMA spring 102, displacing sleeve 98 toward end cap 104 and generally reversing the process to close closure 126. It will be appreciated that in this state the SMA actuator is restored to its initial state and so the described process may be cyclically repeated as necessary.

Figure 5C:
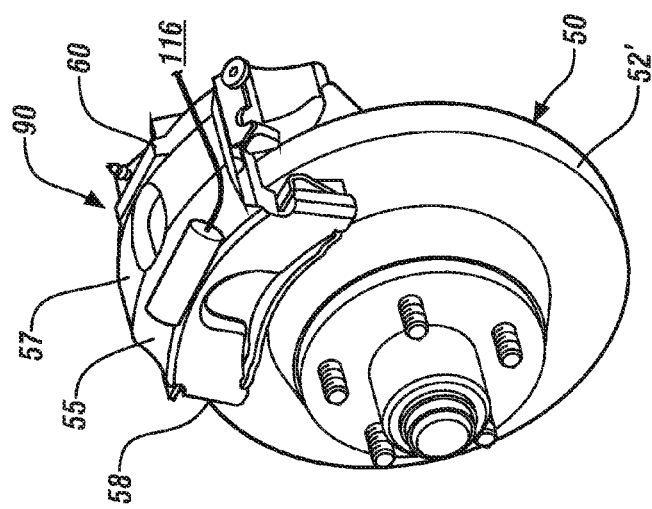
FIGS. 5C-5E show three exemplary positionings of the actuator of FIG. 5A on the brake caliper assembly of the disc brake shown in FIG. 3A.
Figure 5D:
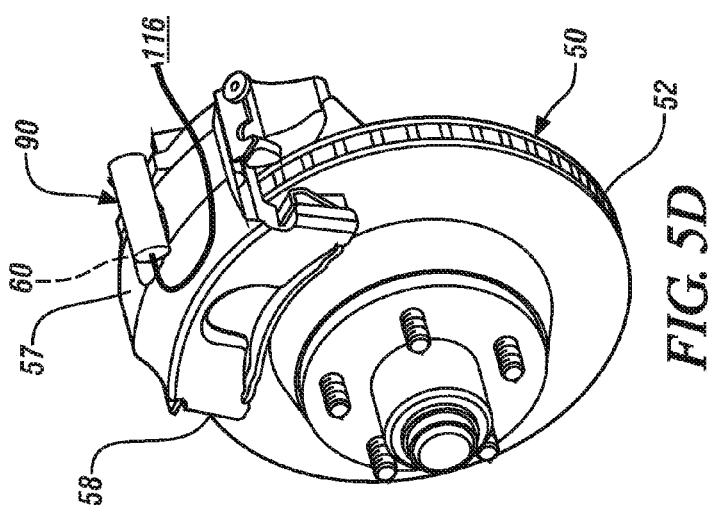
Figure 5E:
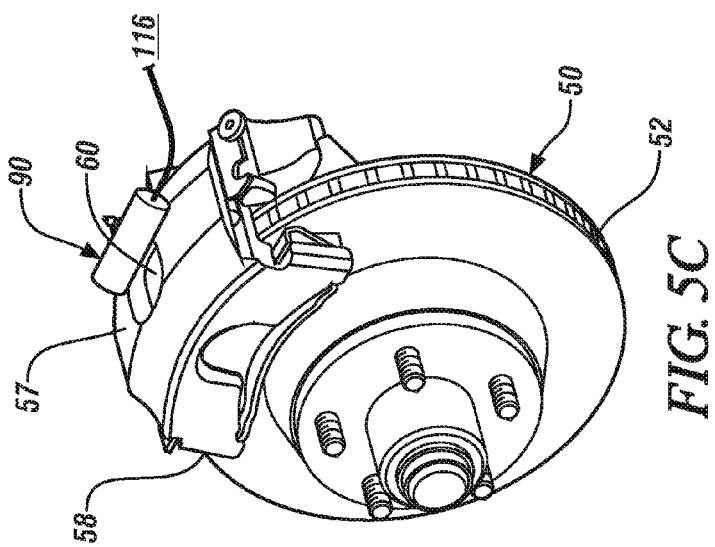

FIGS. 5C-D show representative placements of actuator 90 on caliper support structure 58 of disc brake system 50. Actuator 90 is typically sized and configured to be compatible with the dimensions of the rotor support structure which may span a circumferential length of 120 millimeters or so with comparable width. In FIG. 5C, the actuator is aligned with the rotor 52 and suitably secured (not shown) to surface 57 of the caliper support structure. The actuator is positioned so that at least SMA spring 102 is located over opening 60 to enable good thermal communication between the SMA and the heated air pumped by the vents 64 of rotor 52. FIG. 5D shows a similar positioning, but the actuator 90, while still secured to the caliper support structure, has been rotated to lie transverse to rotor the caliper support structure 58. Such an arrangement may be necessitated by the available clearances in the wheel well or by the requirements of routing cable 116 to duct portion 128. FIG. 5E shows actuator 90 positioned on a 'shoulder' 55 of caliper support structure 58 of brake 50' employing solid rotor 52'. With this rotor, a lesser volume of air may be pumped through opening 60 and it may be preferred to mount actuator 90 in contact with solid portions of caliper support structure 58 and emphasize heat transfer by conduction rather than convection. In all instances the caliper support has been shown unmodified but, for ease of securing actuator 90, or to enhance heat transfer with actuator 90, it will be appreciated that the caliper support structure may be modified. Such modifications may include recesses to better enable integration of the actuator and caliper support structure, or other openings for exhaust of heated air from the disc vents provided they are not prejudicial to the mechanical functioning of the support structure. Of course, features for removable mechanical attachment of the actuator to the caliper support, such as bolt holes or openings to accommodate and secure spring clips, may also be present.

The transformations in SMA, austenite to martensite and martensite to austenite, occur over a temperature range. The extent of transformation and the associated displacement progress smoothly with increase in temperature from a transformation start temperature to a transformation finish temperature. This behavior suggests that closure 126 of FIG. 5B will gradually open, starting at the transformation start temperature and will not be fully open until the transformation finish temperature is achieved.

It will be appreciated that the operating temperature and the operating temperature range of the SMA should be selected to be compatible with the preferred brake operating temperature range. The maximum temperature of the operating range of the SMA, and hence of the SMA actuator, should be less than the maximum preferred brake temperature so that the closure may be fully open and passing the maximum volume of cooling air before the maximum preferred brake operating temperature is achieved. The closure will remain closed, and maintain good vehicle aerodynamics, until the actuator attains the minimum temperature of its operating range. In some SMA alloys the temperature range for complete transformation may be up to about 50° C. or so. But in this application it is preferred to use alloys with a narrower transformation range of about 15° C. or so extend the period when the closure may be maintained in its aerodynamic, closed, configuration.

If progressive opening of closure 126 over this temperature range is acceptable, the direct linkage shown between actuator and closure shown in FIG. 5A is appropriate. If it is preferred to have closure 126 near-instantly transition from open to closed, and vice versa, then a bi-stable or snap action mechanism should be employed. Suitably a snap action mechanism may be connected to cable 116, and positioned between actuator 90 and duct portion 128, with appropriate additional adjustment as required, to ensure mechanical communication between actuator 90 and duct portion 128. Such a snap action mechanism will tend to resist any change of state of the closure, open to closed or closed to open, until sufficient force is applied to overcome its resistance. When the resistance is overcome the device will assist the change in state, supporting the actuator by applying additional force. Such a snap action device will narrow the temperature range over which the closure is in a position intermediate between open and closed states and enforce a more abrupt, less gradual, transition between these two states. Even with the introduction of a snap action device the SMA will still need to experience the same temperature range for transformation, unless snap through occurs under only partial transformation.

Figure 6:
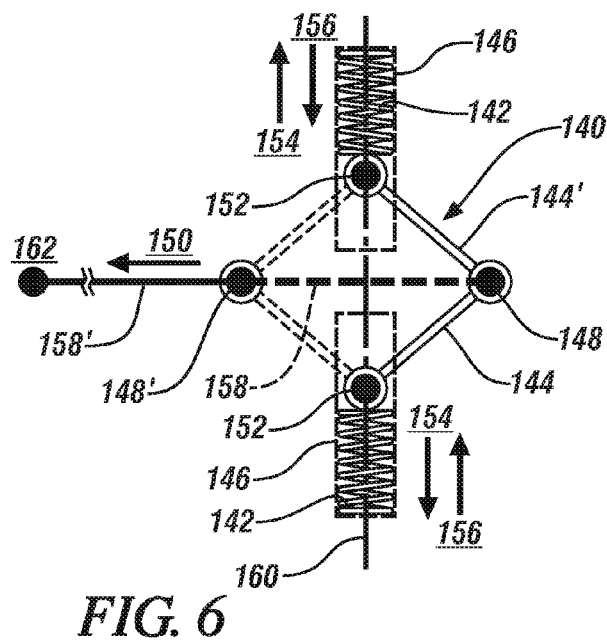
FIG. 6 shows an illustrative mechanical bistable or snap-action mechanism.

An exemplary mechanism is shown at 140 in FIG. 6 and comprises two elongated members 144, 144', connected at pivot 148 at one end and each terminating in pivot 152 on their opposing, second end. Each of pivots 152 engages its respective slot 146 which laterally constrains its motion. Motion of pivots 152 along the long axis of slot 146 is biased by springs 142 which are located to oppose motion of pivots 152 in the direction of arrows 154 and promote motion in the direction of arrows 156. In operation, pivot 148 is acted upon by linkage 158 in the direction of arrow 150. Any motion of pivot 148 is opposed by springs 142 since the nature of the interconnection between members 144, 144' will drive pivots 152 in direction 154 and in opposition to springs 142. However, when pivot 148 advances past centerline 160 springs 142 promote motion of pivots 152 in direction 156 advancing pivot 148 to 148' and linkage 158 to 158'. Thus a continuously-increasing displacement imposed at the opposing end 162 of linkage 158 may induce an abrupt displacement of pivot 148. It will be appreciated that linkage 158 is required to sustain both tension and compression loads. Hence, it should be sufficiently rigid to not kink or buckle under compression. Thus it may be required to securely anchor sheath 108 of cable 116 at multiple locations along its length if cable operation is desired or to substitute a rigid link for cable 116 if such a bi-stable mechanism is employed.

Another characteristic of SMAs is that the transformations exhibit hysteresis, that is, the start temperature of the austenite to martensite transformation is less than the finish temperature of the martensite to austenite transformation. Typically the temperature hysteresis is 30° C. or so but with appropriate processing it may be reduced to about 15° C. or even to about 10° C. Such hysteresis is desirable since it minimizes 'hunting' or 'jitter' in which small temperature changes may lead to wild swings in the state of the closure. With hysteresis, the closure, once opened by the actuator, will remain open until the actuator temperature decreases by the inherent temperature hysteresis of the SMA wire or spring rather than responding to much smaller temperature swings. If additional hysteresis is required, a lost-motion mechanism may be positioned on cable 116 in a manner analogous to that used for the bi-stable mechanism. If required, both a lost motion mechanism and a bi-stable mechanism may be arranged in series and both interposed between actuator 90 and duct portion 128.

Figure 7:
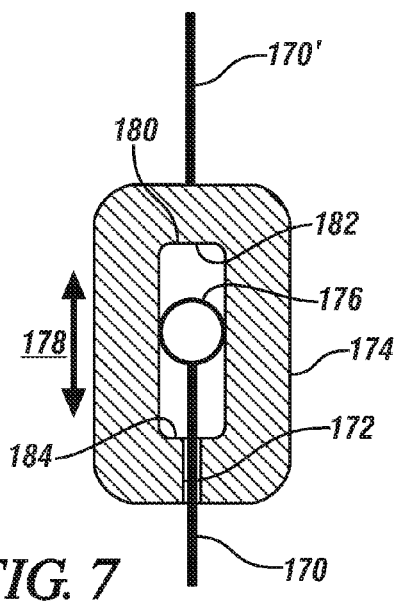
FIG. 7 shows an illustrative lost motion mechanism.

A simple lost motion mechanism is shown in FIG. 7. Wire 170 passes through opening 172 in slotted body 174 and is connected to stop 176 constrained by slot 180 of body 174. In turn, wire 170' is attached to body 174. Thus motion of wire 170 in the direction shown by double arrow 178 is transmitted to stop 176, but not to body 174 and wire 170 until stop 176 engages one of slot ends 182, 184. Similarly motion of wire 170' will be transmitted to wire 170 only when stop 176 engages the appropriate slot end 182 or 184.

As shown, duct portion 128 has lugs 130 (FIG. 5A). These may be suitable for attachment to the inlet, for example 12e of FIG. 2A-C or to duct 30 or in the case of a multi-piece duct (not illustrated) between two of the duct pieces. With good closure sealing which substantially prevents any leakage of air past the closure in its closed position, the effectiveness of the closure is minimally affected by its placement of the closure in the inlet or duct. In this circumstance the closure may, for example, be located at the extremity of the duct furthest from the inlet, that is, at discharge opening 32 of FIG. 1C. More commonly the closure will be located in or close to the inlet, typically within about 30% or so of the distance between the inlet and the discharge opening. It will be appreciated that the closure may also be placed in a unitary duct, such as is shown at 30 in FIG. 2 without prejudice to the operation of the SMA powered closure or the operation of the brake cooling system as a whole. Again, the closure will typically be positioned at a distance of no more than 30% or so of the duct length from the inlet.

Typically this actuator may have an SMA with a transformation temperature of less than about 250° C. or so but greater than about 50° C. or so and in many cases a temperature range of only 50° C. to 100° C. may be suitable. A temperature of 100° C. or so is, of course, far lower than the rotor or pad contact temperatures which may develop under sustained or repeated aggressive braking In this circumstance some brake component temperatures may range from about 450° C. to 650° C. or so. However the choice of such an SMA temperature range is consistent with the observation that the brake fluid temperature remains appreciably less than 100° C. under the same conditions. Thus, the caliper temperature, the brake fluid temperature or the rotor pumped air temperature obtained under high brake temperature may conveniently lie within the range of temperatures in which SMA actuators commonly operate.

Of course, should future developments in brake materials admit of yet higher brake operating temperatures, SMAs with transformation temperatures of up to 250° C. may readily be substituted.

The choice of actuation temperature for the SMA actuator described above and for the paraffin-based actuator detailed below should be informed by knowledge of the relationship between the brake pad temperature and the sense location temperature. Generally it will be preferred to open the inlet closure before the brake temperature rise appreciably affects brake performance. This will require that the opening of the brake inlet closure anticipate the brake temperature. Thus the relationship between brake temperature and actuator temperature must be determined under transient conditions. This relationship may be determined analytically in only a limited number of configurations and will generally be based on computer models or experiment or a combination of both.

A further smart material-powered device is a paraffin-based actuator. Such paraffin actuators harness the power of thermal expansion of the paraffin as it melts and changes from solid to liquid to move a piston. The extent of motion and the load developed as the paraffin expands may be appreciable since, in some paraffins currently in commercial use the volume expansion on melting may be up to 40%. The actuators, by appropriate choice of the carbon number of the paraffin used, may operate in a temperature range of from about 0° C. to about 150° C. More commonly though, paraffin actuators may employ alkanes with carbon numbers ranging from about 20 to 60-80 to provide a useful operating temperature range of from about 35° C. to about 110° C.

Cooling the actuator to solidify the molten paraffin reverses the process, shrinking the paraffin volume and retracting the piston. In many applications an assist spring may be used. The spring may be integral with the actuator or external to the actuator. In some actuators a deformable diaphragm may provide the spring action.

Figure 8A:
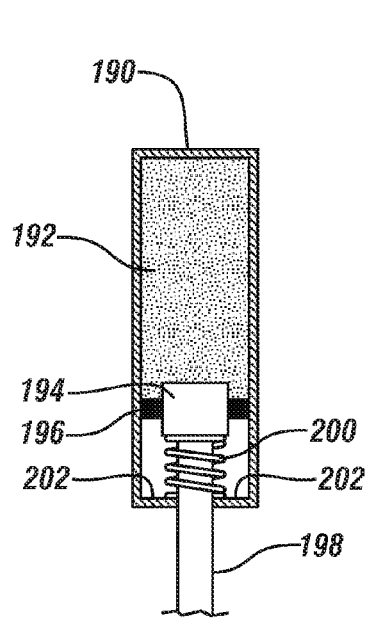
FIG. 8A shows a representative paraffin actuator with the paraffin in its solid form.
Figure 8B:
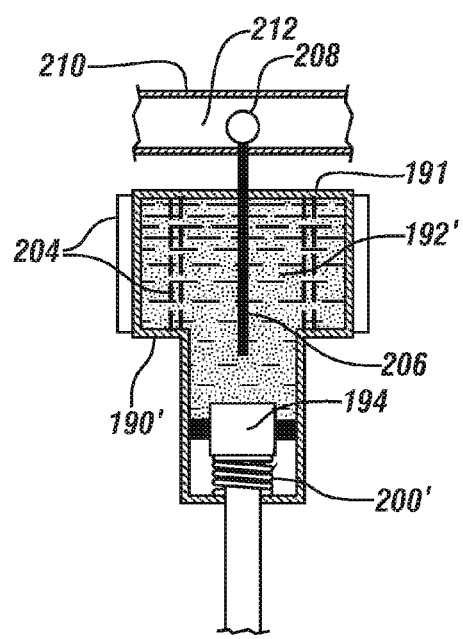
FIG. 8B shows an illustrative alternative paraffin actuator with the paraffin in its liquid form and actuation of the piston and includes a number of features to promote more rapid heating, more rapid cooling and greater stroke, not all of which would necessarily be present on a single operating actuator.

The paraffin is contained within an otherwise sealed container with a piston in a suitably close-fitting bore as shown in the representations shown in FIGS. 8A and 8B. FIG. 8A, which shows the simplest implementation of a paraffin actuator illustrates a hollow, cylindrical container, closed on one end 190, containing paraffin 192 of suitable melting point. The paraffin is confined by the container wall and by piston 194 with seals 196 which engage the interior walls of container 190 to prevent leakage of paraffin. Plunger 198, connected to piston 194, will advance as the paraffin melts. In this representation advance of piston 194 will be opposed by integral return spring 200 which seats on plunger 194 and the underside of cylinder lips 202. On re-solidification of the paraffin on cooling, return spring 200 will displace piston 194 to its starting position. The paraffin cylinder shown in FIG. 8A may be substituted for the SMA actuator of FIG. 5A and located in a similar range of positions on, or proximate to, the brake caliper.

The thermal conductivity of paraffin is appreciably less than that of SMA alloy. Also the required mass of paraffin is significantly greater than the mass of the SMA actuator of FIG. 5A. Thus the transition from closed to open for a paraffin actuator will probably occur appreciably more slowly than for the SMA actuator and it will probably be necessary to incorporate a bi-stable mechanism in the mechanical interconnection between a paraffin actuator and the closure. However, the undercooling which may be expected before the liquid transforms to a solid on cooling, coupled with the thermal inertia resulting from the appreciable paraffin volume required, will probably obviate any need for a lost motion device.

In FIG. 8B, the paraffin is shown melted with piston 194 displaced and return spring 200' compressed. This figure also illustrates some additional or optional features which may be incorporated in such an actuator, although not all features would necessarily be found in a single actuator as depicted. These features include external heating/cooling fins 204 and an internal post 206 extending through cylinder base 191 to protrude beyond cylinder 190'. Internal post 206, fabricated of a material with a suitably high thermal conductivity, is shown terminating in a larger feature 208 and is intended to convey heat to the interior core of the paraffin to enhance heat transfer. Such a configuration may enable sensing alternative elements of the brake system. For example, in illustration 8B, feature 208 is shown in the brake fluid 212 contained in brake line 210. Thus, in this configuration the paraffin actuator will respond primarily to the brake fluid temperature. A further difference between the container configuration shown in FIGS. 8A and 8B is that the container 190' of FIG. 8B is of non-uniform dimension and incorporates cooling fins 204 over a portion of its length. Such a configuration may be useful in efficiently packaging a larger volume of paraffin when a longer stroke is desired. It will be appreciated that only that portion of container 190' against which piston 194 seals need be cylindrical. Also the base 191 of container 190' may be shaped to enable improved thermal communication with the sensed region of the brake system. For example base 191 may be shaped with a recess shaped to at least partially accommodate brake line 210 to more effectively sense brake fluid temperature. If the actuator is to be positioned on the caliper support base 191 may be complementarily shaped to conform to the geometry of such caliper support.

Practices of the invention have been described using certain illustrative examples, but the scope of the invention is not limited to such illustrative examples.

The invention claimed is:

1. A device for providing supplementary cooling air to a vehicle brake, at least a portion of the brake rotating with a wheel, the wheel and brake being located in a wheel well, the device comprising:

an inlet constructed and adapted for placement in a vehicle with a wheel, a brake and a wheel well, the inlet being so placed as to receive a portion of an airflow resulting from the motion of the vehicle;

a duct with a length and extending from the inlet to the vehicle brake; the duct being connected at a first end to the inlet to convey the airflow portion received by the inlet and having an opening at a second end, distant from the inlet, the opening being positioned proximate to the vehicle brake so that the airflow portion received by the inlet and conveyed by the duct may be discharged into the wheel well and onto some portion of the vehicle brake and so provide supplementary cooling air to the brake;

a closure, located in the inlet or the duct, capable of preventing passage of the air flow portion in a first configuration and adapted to permit passage of the air flow portion in a second configuration;

a temperature-operated actuator which undergoes a phase change operably connected to the closure and adapted to sense a temperature indicative of the vehicle brake temperature, the actuator operating the closure and enabling flow of the air flow portion to the brake and wheel well when the brake temperature sensed by the actuator exceeds a predetermined temperature.

2. The device for providing supplementary cooling air to a vehicle brake as recited in claim 1 in which the temperature-operated actuator comprises a shape memory alloy (SMA), the SMA being selected to undergo a phase change when the brake attains the predetermined temperature.

3. The device for providing supplementary cooling air to a vehicle brake as recited in claim 1 in which the temperature-operated actuator comprises a paraffin wax actuator, the paraffin wax actuator being selected to undergo a phase change when the brake attains the predetermined temperature.

4. The device for providing supplementary cooling air to a vehicle brake as recited in claim 2 in which the SMA alloy has the form of a coil spring and the actuator further comprises a biasing spring.

5. The device for providing supplementary cooling air to a vehicle brake as recited in claim 2 in which a shape of the SMA alloy is one of the group consisting of a wire, a braid, a tape, a cable and a layer deposited on a flexible substrate.

6. The device for providing supplementary cooling air to a vehicle brake as recited in claim 2 in which the composition of the SMA comprises two or more of the elements of the group consisting of nickel, titanium, indium, aluminum, gallium, copper, zinc, gold, cadmium, manganese, iron, tin, silicon, palladium and platinum.

7. The device for providing supplementary cooling air to a vehicle brake as recited in claim 2 in which the temperature range at which the SMA starts to undergo transformation from a martensite phase to an austenite phase is between 50° C. and 250° C.

8. The device for providing supplementary cooling air to a vehicle brake as recited in claim 3 in which the temperature range in which the paraffin actuator operates is between 35° C. and 110° C.

9. The device for providing supplementary cooling air to a vehicle brake as recited in claim 1 further comprising one or both of a snap action mechanism and a lost motion mechanism.

10. The device for providing supplementary cooling air to a vehicle brake as recited in claim 1 in which the inlet is positioned in the vehicle airflow at a location where the pressure of the airflow is greater than the pressure of the air in a vehicle wheel well.

11. The device for providing supplementary cooling air to a vehicle brake as recited in claim 1 in which the brake is a disc brake.

12. The device for providing supplementary cooling air to a vehicle brake as recited in claim 1 in which the brake is a drum brake.

13. The device for providing supplementary cooling air to a vehicle brake as recited in claim 1 in which the closure is one of the group consisting of butterfly valve, a gate valve, a ball valve, a louver valve, an iris valve, an SMA uni-morph and an SMA bi-morph.

14. The device for providing supplementary cooling air to a vehicle brake as recited in claim 1 in which the duct and inlet have a combined length and the closure is placed so that the distance from the inlet to the closure is no more than 30% of the combined length.

15. A motor vehicle with a body structure, the vehicle comprising:

at least four wheels, each supporting a tire, each wheel being mounted to a rotating component of a brake system, each wheel, tire and rotating brake system component being positioned in an individual wheel well in the body structure;

an inlet located in the vehicle body structure and positioned to receive a portion of an airflow resulting from the motion of a vehicle;

a duct with a length and extending from the inlet to a wheel well, the duct being connected at a first end to the inlet to convey the airflow portion received by the inlet and having an opening at a second end, distant from the inlet, to discharge the airflow portion into the wheel well and so provide cooling air to the rotating brake system component;

a progressively operable closure, located in the inlet or the duct, capable of preventing passage of the air flow portion in a first configuration, capable of passing the air flow portion in a second configuration, and capable of passing some fraction of the air flow portion when in any of a plurality of configurations intermediate between the first and second configurations; and a temperature-operated actuator operably connected to the closure, the actuator having an operating temperature range comprising a minimum and a maximum temperature, and adapted to sense a temperature indicative of the vehicle brake temperature and to respond to changes in indicated brake temperature by repeatedly cycling the closure between its first and second configurations to alternately deny passage of the air flow portion when the actuator temperature is less than the minimum temperature of the actuator operating temperature range and to enable passage of the air flow portion when the temperature of the actuator exceeds the maximum temperature of the actuator operating temperature range, the maximum temperature of the actuator operating temperature range being selected to be less than a predetermined brake temperature.

16. The motor vehicle comprising at least one rotating brake system component cooled by an air flow as recited in claim 14 in which the temperature-operated actuator comprises a shape memory alloy (SMA).

17. The motor vehicle comprising at least one rotating brake system component cooled by an air flow as recited in claim 14 in which the temperature-operated actuator comprises a paraffin wax actuator.

18. The motor vehicle comprising at least one rotating brake system component cooled by an air flow as recited in claim 15 in which the SMA alloy has a shape of one of the group consisting of a wire, a braid, a tape, a cable, a layer deposited on a flexible substrate and a coil spring and the actuator further comprises a biasing spring.

19. The motor vehicle comprising at least one rotating brake system component cooled by an air flow as recited in claim 15 in which the composition of the SMA comprises two or more of the elements of the group consisting of nickel, titanium, indium, aluminum, gallium, copper, zinc, gold, cadmium, manganese, iron, tin, silicon, palladium and platinum.

20. The motor vehicle comprising at least one rotating brake system component cooled by an air flow as recited in claim 15 in which the temperature range at which the SMA starts to undergo transformation from a martensite phase to an austenite phase is between 50° C. and 250° C.

21. The motor vehicle comprising at least one rotating brake system component cooled by an air flow as recited in claim 14 in which the inlet is positioned in the vehicle airflow at a location where the pressure of the airflow is greater than the pressure of the air in a vehicle wheel well.

22. The motor vehicle comprising at least one rotating brake system component cooled by an air flow as recited in claim 14 in which the rotating brake system component is a disc.

23. The motor vehicle comprising at least one rotating brake system component cooled by an air flow as recited in claim 14 in which the closure is one of the group consisting of butterfly valve, a gate valve, a ball valve, a louver valve, an iris valve, an SMA uni-morph and an SMA bi-morph.

24. The motor vehicle comprising at least one rotating brake system component cooled by an air flow as recited in claim 14 in which the duct and inlet have a combined length and the distance from the inlet to the closure is no more than 30% of the combined length.

* * * * *